United States Patent
Kabe et al.

(10) Patent No.: US 9,745,194 B2
(45) Date of Patent: Aug. 29, 2017

(54) METHOD OF PRODUCING CATHODE ACTIVE MATERIAL FOR LITHIUM SECONDARY BATTERY

(75) Inventors: Isao Kabe, Yokohama (JP); Akihiko Shirakawa, Chiba (JP); Gaku Oriji, Yokohama (JP); Akihisa Tonegawa, Yokohama (JP)

(73) Assignee: SHOWA DENKO K.K., Minato-ku, Tokyo (JP)

( * ) Notice: Subject to any disclaimer, the term of this patent is extended or adjusted under 35 U.S.C. 154(b) by 388 days.

(21) Appl. No.: 14/113,731

(22) PCT Filed: Apr. 25, 2012

(86) PCT No.: PCT/JP2012/061036
§ 371 (c)(1),
(2), (4) Date: Oct. 24, 2013

(87) PCT Pub. No.: WO2012/147767
PCT Pub. Date: Nov. 1, 2012

(65) Prior Publication Data
US 2014/0056797 A1     Feb. 27, 2014

(30) Foreign Application Priority Data
Apr. 28, 2011   (JP) .................... 2011-102090

(51) Int. Cl.
*H01M 4/88*   (2006.01)
*C01B 25/45*  (2006.01)
*H01M 4/58*   (2010.01)
*H01M 10/052* (2010.01)

(52) U.S. Cl.
CPC ........... *C01B 25/45* (2013.01); *H01M 4/5825* (2013.01); *H01M 10/052* (2013.01)

(58) Field of Classification Search
CPC .................................................. H01M 4/5824
USPC .................... 252/182.1, 502, 506; 429/231.8
See application file for complete search history.

(56) References Cited

U.S. PATENT DOCUMENTS

2009/0117022 A1    5/2009  Nuspl et al.
2010/0304217 A1*  12/2010  Suzuki ................ H01M 4/5825
                                                           429/224
2011/0073803 A1    3/2011  Li et al.

FOREIGN PATENT DOCUMENTS

| | | | | |
|---|---|---|---|---|
| CA | 2755802 | A1 | 9/2010 | |
| CN | 101276909 | A | 10/2008 | |
| CN | 101540398 | A | 9/2009 | |
| CN | 101830453 | * | 9/2015 | ............ C01B 25/45 |
| JP | 09-134725 | A | 5/1997 | |
| JP | 09-171827 | A | 6/1997 | |
| JP | 2005-123107 | A | 5/2005 | |
| JP | 2008-047412 | A | 2/2008 | |
| JP | 2008-532910 | A | 8/2008 | |
| JP | 2009-032656 | A | 2/2009 | |
| JP | 2009-259807 | A | 11/2009 | |
| JP | 2010-218970 | * | 9/2010 | ............ H01M 4/139 |
| JP | 2010-218970 | A | 9/2010 | |
| JP | CN101830451 | A * | 9/2010 | ............ C01B 25/45 |
| JP | 2010-244723 | * | 10/2010 | .......... H01M 4/1397 |
| JP | 2010-244723 | A | 10/2010 | |
| JP | 2010-251302 | A | 11/2010 | |
| JP | 2011-009190 | A | 1/2011 | |
| JP | 2011-077036 | A | 4/2011 | |
| WO | 2008/105490 | A1 | 9/2008 | |

OTHER PUBLICATIONS

Communication dated Mar. 27, 2015 from the State Intellectual Property Office of the P.R.C. in counterpart application No. 201280020124.5.
International Search Report for PCT/JP2012/061036 dated Jul. 10, 2012.

* cited by examiner

Primary Examiner — Khanh Tuan Nguyen
(74) Attorney, Agent, or Firm — Sughrue Mion, PLLC

(57) ABSTRACT

The invention provides a method of producing a cathode active material for a lithium secondary battery, whereby it is possible to configure a lithium secondary battery in which the discharge capacity is improved and elution of lithium ions from the lithium metal phosphate is suppressed when washing the lithium metal phosphate after the same was synthesized. The method of producing a cathode active material for a lithium secondary battery includes synthesizing a lithium metal phosphate represented by a composition formula $LiMPO_4$, wherein the element M represents one or two or more of transition metals selected from among Fe, Mn, Co and Ni, and after the synthesis, washing the lithium metal phosphate with a washing liquid containing lithium ion.

18 Claims, No Drawings

METHOD OF PRODUCING CATHODE ACTIVE MATERIAL FOR LITHIUM SECONDARY BATTERY

CROSS REFERENCE TO RELATED APPLICATIONS

This application is a National Stage of International Application No. PCT/JP2012/061036 filed Apr. 25, 2012, claiming priority based on Japanese Patent Application No. 2011-102090 filed Apr. 28, 2011, the contents of all of which are incorporated herein by reference in their entirety.

TECHNICAL FIELD

The present invention relates to a method of producing a cathode active material for a lithium secondary battery.

BACKGROUND OF THE INVENTION $LiMPO_4$ (M represents transition metals), which is a olivine-type lithium metal phosphate and has a larger electric capacity, may be used as a cathode active material for lithium secondary batteries which is not as expensive as that using $LiCoO_2$ which has conventionally been widely used as a cathode active material for lithium secondary batteries in the related art. Accordingly, $LiMPO_4$ has been expected as a cathode active material of a lithium secondary battery and particularly, as a cathode active material of a large-scaled lithium secondary battery for vehicles. (Patent Documents 1 and 2)

Various synthesis methods, such as a solid phase method, a hydrothermal method, and a co-precipitation method have been proposed as methods for synthesizing $LiMPO_4$. To increase the purity of $LiMPO_4$ by removing the impurities included therein, normally, the post-synthesis lithium metal phosphate ($LiMPO_4$) is washed (Patent Documents 3 and 4).

The Patent Documents 3 and 4 disclose that a cathode active material for a lithium secondary battery containing a lithium metal phosphate is washed with a pH buffer, in order to increase its purity by removing the impurities included therein. In particular, it is disclosed that when the lithium-metal phosphate is $LiFePO_4$, it is possible to not elute Fe from $LiFePO_4$ and reduce the impurity containing a divalent iron, such as $FeSO_4$, FeO, $Fe_3(PO_4)_2$. Further, it is also disclosed that it is possible to reduce impurities included in the $LiFePO_4$, such as $Li_2CO_3$ or $Li_3PO_4$.

[Patent Document 1] JP Patent Publication No. 9-171827
[Patent Document 2] JP Patent Publication No. 9-134725
[Patent Document 3] JP Patent Publication No. 2009-32656
[Patent Document 4] JP Patent Publication No. 2009-259807

SUMMARY OF THE INVENTION

As mentioned above, Patent Documents 3 and 4 disclosed a washing liquid to suppress the elution of Fe from $LiFePO_4$ in the lithium iron phosphate. However, there is no particularly disclosure or suggestion that washing liquid suppresses the elution of Li from the $LiFePO_4$.

On the other hand, it was found that the discharge capacity of the lithium secondary battery produced by using the cathode active material decreased as the washing time increased when a post-synthesis lithium metal phosphate $LiMPO_4$ was washed with water.

Results of the lithium iron phosphate $LiFePO_4$ were shown in Table 1.

Discharge capacities shown in Table 1 show measurement results of the second discharge capacities of two charge-discharge cycles. At a temperature of 25° C., a charge-discharge circle, in which constant current constant voltage charging was carried out to 3.9V with a current of 0.1 C, and then constant current discharging was carried out to 2.3V with a current of 0.1 C, was repeated two times.

TABLE 1

| Washing Time (Minute) | 0 | 1 | 2 | 3 | 4 | 5 | 6 |
|---|---|---|---|---|---|---|---|
| $2^{nd}$ Discharge capacity (mAh/g) | 114.5 | 144.8 | 146.3 | 143.8 | 140.4 | 136.6 | 130.4 |

The discharge capacities are increasing, as shown in Table 1, after one minute and two minutes of water washing time, but the discharge capacities decrease after 3 minutes. The discharge capacities decrease as the washing time becomes longer. The possible reason is shown in the following. When the water washing time is extended, the color of the powder of the lithium iron phosphate $LiFePO_4$ turns to blue from light green, and lithium ions are eluted from the surface of the lithium iron phosphate $LiFePO_4$ during washing, and then a heterogeneous layer on the surface is formed. This heterogeneous layer may inhibit the diffusion of lithium ions.

The present invention was made in view of the above problems. It is intended to provide a method of producing a cathode active material comprising an olivine-type lithium metal phosphate for a lithium secondary battery. Since elution of lithium ions from the lithium metal phosphate is suppressed during the washing step after synthesizing the lithium metal phosphate, the discharge rate and the charge-discharge capacity of the lithium secondary battery made of the obtained olivine-type lithium metal phosphate is improved.

In order to achieve the above object, the present invention provides the following means.

(1) A method of producing a cathode active material for a lithium secondary battery, wherein the method comprises:
synthesizing a lithium metal phosphate represented by a composition formula $LiMPO_4$, wherein the element M represents one or two or more of transition metals selected from Fe, Mn, Co and Ni, and then
washing the lithium metal phosphate with a washing liquid containing lithium ions.

(2) The method of producing a cathode active material for a lithium secondary battery according to (1), wherein a solute of the washing liquid comprises at least one of $LiClO_4$, $Li_2CO_3$, LiOH, $LiPF_6$, $Li_3PO_4$, $LiH_2PO_4$, and $CH_3CO_2Li$.

(3) The method of producing a cathode active material for a lithium secondary battery according to (1) or (2), wherein a solvent of the washing liquid is water or liquid containing water.

(4) The method of producing a cathode active material for a lithium secondary battery according to (3), wherein a solvent of the washing liquid is water.

(5) The method of producing a cathode active material for a lithium secondary battery according to any one of (1) to (4), wherein pH of the washing liquid containing the lithium ions is in the range of from 5 to 9.

(6) The method of producing a cathode active material for a lithium secondary battery according to any one of (1) to (5), wherein the washing step is carried out when the temperature of the washing liquid containing lithium ion is 15° C. or more.

(7) The method of producing a cathode active material for a lithium secondary battery according to any one of (1) to (6), wherein the washing time is one hour or less.

(8) The method of producing a cathode active material for a lithium secondary battery according to any one of (1) to (7), wherein the washing step comprises a step of agitating the washing liquid.

(9) The method of producing a cathode active material for a lithium secondary battery according to any one of (1) to (8), wherein the post-synthesis lithium metal phosphate comprises one or two kinds of elements selected from the group consisting of V and Nb.

(10) The method of producing a cathode active material for a lithium secondary battery according to any one of (1) to (9), wherein a particle diameter of the post-synthesis lithium metal phosphate is in the range of from 20 to 200 nm.

(11) The method of producing a cathode active material for a lithium secondary battery according to any one of (1) to (10), wherein a ratio of Li atoms number to M atoms number in a region up to depth of 2 nm from the surface of the post-synthesis lithium metal phosphate is in the range of 0.7 or more and less than 1.1.

(12) The method of producing a cathode active material for a lithium secondary battery according to any one of (1) to (11), wherein method further comprises a step of mixing the lithium metal phosphate with a liquid in which a material containing carbon atoms is dissolved, after the washing.

(13) The method of producing a cathode active material for a lithium secondary battery according to (12), wherein method further comprises a step of removing a solvent of the liquid in which a material containing carbon atoms is dissolved after the mixing step.

(14) The method of producing a cathode active material for a lithium secondary battery according to (13), wherein method further comprises a step of heating the mixture of the lithium metal phosphate and the material containing carbon atoms for 1 hour to 20 hours under an atmosphere containing oxygen with a concentration 1% or less at a temperature of 400° C. to 900° C., after removing the solvent of the liquid in which the material containing carbon atoms is dissolved.

(15) The method of producing a cathode active material for a lithium secondary battery according to any one of (1) to (11), the method further comprises a step of forming a layer containing carbon on at least a portion of the surface of the lithium metal phosphate after the washing step.

(16) The method of producing a cathode active material for a lithium secondary battery according to any one of (1) to (15), wherein the transition metal (M) in the $LiMPO_4$ is either Mn or Fe.

(17) The method of producing a cathode active material for a lithium secondary battery according to any one of (1) to (15), wherein the transition metal (M) in the $LiMPO_4$ comprises both Mn and Fe.

(18) The method of producing a cathode active material for a lithium secondary battery according to (1) to (17), wherein the synthesizing step is carried out by hydrothermal synthesis method.

(19) The method of producing a cathode active material for a lithium secondary battery according to (18), wherein the hydrothermal synthesis method is carried out by using a liquid containing water, a lithium (Li) source, one or two or more kinds of transition metal (M) source, and a phosphoric acid ($PO_4$) source as raw materials.

(20) The method of producing a cathode active material for a lithium secondary battery according to (18), wherein the hydrothermal synthesis is carried out by using a liquid containing water, $Li_3PO_4$, and one or two or more kinds of transition metal (M) source as raw materials.

(21) The method of producing a cathode active material for a lithium secondary battery according to (19) or (20), wherein the transition metal (M) source is $MnSO_4$ and/or $FeSO_4$.

(22) The method of producing a cathode active material for a lithium secondary battery according to (19) or (20), wherein the transition metal (M) source is both $MnSO_4$ and $FeSO_4$.

(23) The method of producing a cathode active material for a lithium secondary battery according to (19), (21) or (22), wherein LiOH is used as the lithium (Li) source.

(24) The method of producing a cathode active material for a lithium secondary battery according to any one of (19), (21) to (23), wherein $H_3PO_4$ is used as the phosphate ($PO_4$) source.

According to the present invention, it provides a method of producing a lithium secondary battery cathode active material containing an olivine-type lithium metal phosphate. The discharge rate and the charge-discharge capacity of the lithium secondary battery made of olivine-type lithium metal phosphate are improved. The method can be configured that the elution of lithium ions from the lithium metal phosphate is suppressed during the washing step after synthesizing the olivine-type lithium metal phosphate.

DETAIL DESCRIPTION OF THE INVENTION

As an embodiment of the invention, a method of producing a cathode active material for a lithium secondary battery will be described.

(Method of Producing a Lithium Secondary Battery Cathode Active Material)

A preferred embodiment of a method of producing a cathode active material for a lithium secondary battery of the present invention contains the following steps. After synthesizing a lithium metal phosphate represented by the compositional formula $LiMPO_4$, the lithium metal phosphate is washed with a washing liquid containing lithium ions. Here, the element M of $LiMPO_4$ is a transition metal selected from one or two or more of Ni, Fe, Mn, and Co.

A synthesis method of a lithium metal phosphate is not particularly limited. It is possible to use a hydrothermal synthesis or a solid-phase synthesis method.

A solute of washing liquid containing a lithium ion is not particularly limited as long as that lithium ions are yielded by dissolving the solute in the liquid, but it is preferable to use at least one of $LiClO_4$, $Li_2CO_3$, LiOH, $LiPF_6$, $Li_3PO_4$, $LiH_2PO_4$, and $CH_3CO_2Li$.

As a solute of the washing liquid containing lithium ion, a solute which does not yield lithium ions may be added.

The lithium ion concentration of the washing liquid containing lithium ion is preferably 0.01 mol/L or more, but 1 mol/L or more is more preferable. When the lithium ion concentration is less than 0.01 mol/L, the effect of suppressing the lithium ion elution from the lithium metal phosphate $LiMPO_4$ is too small, and as a result, it is difficult to increase the discharge rate and the charge-discharge capacity. When the lithium ion concentration is 1 mol/L or more, the effect of suppressing the lithium ion elution is large, and as a result, the discharge rate and discharge capacity can be increased sufficiently.

It is preferable that the solvent of the washing liquid is liquid containing water, and it is more preferable that the solvent of the washing liquid is water. The purpose of performing washing with a washing liquid containing lithium ions is to dissolve a synthetic raw material in the synthesized lithium metal phosphate to yield ions and then remove them. For example, when the lithium metal phosphate $LiFePO_4$ is synthesized by using $FeSO_4$ as a source of transition metal (M), the purpose is to dissolve the raw materials contained in the post-synthesis lithium metal phosphate $LiFePO_4$ to yield sulfate ions and then remove them.

It is preferable that the pH of the washing liquid containing a lithium ion is from 5 to 9. This is because it is easy to elute the metal M from $LiMPO_4$ when the pH is 5 or less, or 9 or more.

Adjusting of the pH can be carried out by adding aqueous ammonia or sulfuric acid into the washing liquid. The pH can be measured by a pH meter which uses the principle of the glass electrode method.

It is preferable that the washing is carried out with a washing liquid containing lithium ions at temperature of 15° C. or higher. This is because the efficiency of removing the impurities mixed in $LiMPO_4$ decreases at temperatures lower than 15° C.

It is preferable that washing time is one hour or less. $LiMPO_4$ may be oxidized by oxygen that is dissolved in the washing liquid if the washing time is longer than one hour.

It is preferable that the washing step includes a step of agitating the washing liquid containing lithium ions. This is because that the impurities mixed in $LiMPO_4$ are dissolved into the washing liquid by stirring, and then remaining impurities are suppressed.

It is preferable that the post-synthesis lithium metal phosphate contains one or two of V and Nb. This is because it is possible to suppress a decrease of the capacity when charge and discharge are repeated in the present of V and/or Nb.

The lithium metal phosphate $LiMPO_4$ containing Nb or V may be produced by adding a material containing Nb or V into the synthesis raw material of the lithium metal phosphate. Examples of the material containing Nb include niobium phenoxide ($Nb(OC_6H_5)_5$ and niobium chloride $NbCl_5$, and an example of the material containing V includes ammonium vanadate ($NH_4VO_3$).

It is preferable that the particle size of the post-synthesis lithium metal phosphate is 20 to 200 nm. The crystallinity decreases when the particle size is smaller than 20nm. As a result, capacities decrease. On the other hand, the rate of charge and discharge decreases when the particle size is larger than 200 nm.

The particle size of the lithium metal phosphate can be adjusted to a range from 20 to 200 nm by adjusting the pH of the post-synthesis liquid. However, the scope of adjusting the pH may be changed as concentrations of the respective lithium (Li) source, a transition metal (M) source, and a phosphate ($PO_4$) source, or types of transition metal (M) sources, synthesis temperature, synthesis time, and the stirring strength. As a method of adjusting the pH, for example, aqueous ammonia and sulfuric acid may be added to the raw material.

It is preferable that the ratio of Li atoms number with respect to M atoms in the region up to 2 nm depth from the surface of the post-synthesis lithium metal phosphate is 0.7 or more and less than 1.1.

For example, the ratio of Li atoms number with respective to M atoms can be determined by TEM-EELS (electron energy loss spectroscopy).

The ratio of Li atoms number to M atoms number is close to 1 when the lithium metal phosphate is synthesized by the conventional method. However, as usual, when the post-synthesis lithium metal phosphate is washed with water, Li atoms are eluted from the vicinity of the surface of the lithium metal phosphate. As a result, the ratio of Li atoms number to the metal atom M is decreasing, and then ratio of Li atoms number to M atoms number in the region up to 5 nm depth from the surface of the lithium metal phosphate is less than 1. However, when washing with the washing liquid containing lithium ions of the present invention is performed properly, elution of Li atoms from the vicinity of the surface is suppressed. As a result, the depth range in which the ratio of Li atoms to M atoms number varies becomes smaller (the depth range is the range of the depth in the direction from the surface). In addition, it is due to other factors than the washing step that the deviation of the composition ratio is greater than 1 (1 to 1.1). In addition, the post-synthesis lithium metal phosphate before washing usually has a ratio of Li atoms number to M atoms number in the range of 0.9 to 1.1.

It is preferable that after washing, the lithium metal phosphate is mixed with a liquid in which a material containing carbon atoms is dissolved.

This is because forming a layer containing carbon on at least a portion of the surface of the lithium metal phosphate may improve conductivity.

As the liquid in which the material containing carbon atoms is dissolved, it is not particularly limited as long as that the liquid has low reactivity with $LiMPO_4$, and for example, water, ethanol, or acetone may be used.

It is more preferable to remove the solvent of the liquid in which a material containing carbon atoms is dissolved after the mixing step.

This is because that forming a layer containing carbon with less impurity on at least a portion of the surface of the lithium metal phosphate may further improve conductivity.

After removing the solvent in the liquid in which material containing carbon atoms is dissolved, it is more preferable that the mixture of the material containing carbon atoms and the lithium metal phosphate $LiMPO_4$ are heated to 1 hour or more and 20 hours or less under an atmosphere of oxygen at concentration 1% or less and at a temperature of 400° C. or higher and 900° C. or lower.

This is because that oxide reaction may occur if oxygen concentration is higher than 1%. Further, the content of carbon atoms of the layer containing carbon formed on the surface of the lithium metal phosphate become lower when the temperature decreases to a temperature lower than 400° C. As a result, the conductivity decreases. When the temperature increases to a temperature higher than 900° C., the grains of crystals of $LiMPO_4$ grow. As a result, the rate of charge and discharge decreases. When the heating time is less than 1 hour, the amount of carbon atoms in the layer containing carbon formed on the surface of the lithium metal phosphate is reduced, and as a result, the conductivity is reduced. When the heating time is longer than 20 hours, the energy used to heat the furnace is wasted.

It is preferable to form a layer containing carbon on at least a portion of the surface of the lithium metal phosphate after the washing.

This is because it is possible to improve conductivity.

As the transition metal (M) constituting the lithium metal phosphate $LiMPO_4$, one or two or more elements selected from Fe, Mn, Co and Ni may be used, and in particular, it is preferable to use either Mn or Fe. That is, as the lithium metal phosphate, it is preferable to use either $LiMnPO_4$ or $LiFePO_4$, or to use $LiFeM'PO_4$ (M' represents a transition metal except Fe) or $LiMnM'PO_4$ (M' represents a transition metal except Mn). Further, as the transition metal (M) constituting the lithium metal phosphate $LiMPO_4$, it is also preferable that the transition metals including both Mn and Fe are used. That is, as the lithium metal phosphate, it is also preferable that $LiFeMnPO_4$ or $LiFeMnM'PO_4$ (M' represents a transition metal except Mn and Fe) are used.

It is possible to increase the battery capacity per mass when one of the $LiMnPO_4$ or $LiFePO_4$, one of $LiFeM'PO_4$ (M' represents a transition metal except Fe) or $LiMnM'PO_4$ (M' represents a transition metal except Mn), $LiFeMnPO_4$, or $LiFeMnM'PO_4$ (M' represents a transition metal except Mn and Fe) are used, because each of $LiMnPO_4$ or $LiFePO_4$ has a higher theoretical capacity ($LiFePO_4$: 170 mAh/g; $LiMnPO_4$: 171 mAh/g).

As the synthesis method of the lithium metal phosphate $LiMPO_4$ before washing, it is preferable that the synthesis is carried out by hydrothermal synthesis method. When using the hydrothermal synthesis method, $LiMPO_4$ having a small particle size is obtained at a relatively low temperature in a short amount of time.

In hydrothermal synthesis of the lithium metal phosphate $LiMPO_4$ before washing, the liquid containing water, and lithium (Li) source, one or two or more transition metal (M) source, phosphates ($PO_4$) source may be used as raw materials.

Moreover, in the hydrothermal synthesis of the lithium metal phosphate $LiMPO_4$ before washing, liquid containing water, $Li_3PO_4$, and one or two or more transition metal (M) sources may be used as raw materials.

In hydrothermal synthesis, as the transition metal (M) source, those containing either $MnSO_4$ or $FeSO_4$ may be used. As a result, as the lithium metal phosphate, $LiMnPO_4$ or $LiFePO_4$, or $LiMnM'PO_4$ (M' represents a transition metal except Mn) or $LiFeM'PO_4$ (M' represents a transition metal except Fe) may be synthesized.

In the hydrothermal synthesis, as the transition metal (M) source, those including both $MnSO_4$ and $FeSO_4$ may be used. As a result, as the lithium metal phosphate, $LiFeMnPO_4$, or $LiFeMnM'PO_4$ (M' represents a transition metal except Mn and Fe) may be synthesized.

Further, in the hydrothermal synthesis, as the lithium (Li) source, LiOH may be used.

Further, in the hydrothermal synthesis, as the phosphate ($PO_4$) source, $H_3PO_4$ may be used.

(Lithium Secondary Battery)

The lithium secondary battery according to an exemplary embodiment includes a cathode, an anode, and a nonaqueous electrolyte. In the lithium secondary battery, as a cathode active material contained in the cathode, the cathode material produced according to the above-described method is used. When this cathode material is contained, the discharge rate and capacity of the lithium secondary battery may be improved. Hereinafter, the cathode, the anode, and the nonaqueous electrolyte which constitute the lithium secondary battery will be sequentially described below.

(Cathode)

In the lithium secondary battery according to a preferable aspect of the embodiment, as the cathode, a sheet-like electrode, which includes a cathode mix containing a cathode material, a binding agent, and a conductive additive contained optionally, and a cathode current collector bonded to the cathode mix, may be used. In addition, as the cathode, a pellet-type or sheet-like cathode, which is formed by molding the cathode mix into a circular plate, may be used.

As a cathode material, the lithium metal phosphate, which is produced according to the above-described method, is used. The lithium metal phosphate may be used by mixing the cathode active material known in the art.

Examples of the binding agent include polyethylene, polypropylene, ethylene propylene copolymers, ethylene propylene terpolymer, butadiene rubber, styrene butadiene rubber, butyl rubber, polytetrafluoroethylene, poly(meth) acrylate, polyvinylidene fluoride, polyethylene oxide, polypropylene oxide, polyepichlorohydrin, polyphosphazene, polyacrylonitrile, and the like.

Examples of the conductive additive include a conductive metal powder such as a silver powder; a conductive carbon powder such as furnace black, ketjen black, and acetylene black, carbon nanotube, carbon nanofiber, vapor phase method carbon fibers and the like. As the conductive additive, the vapor phase method carbon fiber is particularly preferable. A fiber length of the vapor phase method carbon fiber is preferably 5 nm to 0.2 µm. The ratio of fiber length/fiber diameter is preferably 5 to 1000. The amount of the vapor phase method carbon fiber is preferably 0.1% by mass to 10% by mass on the basis of the dried mass of the cathode mix.

Furthermore, examples of the cathode current collector include foil of a conductive metal, a mesh of a conductive metal, a punched metal of the conductive metal, and the like. As the conductive metal, aluminum or an aluminum alloy is preferable.

Furthermore, the cathode mix may contain an ion conductive compound, a thickening agent, a dispersing agent, a lubricating agent, and the like. Examples of the ion conductive compound include polysaccharides such as chitin and chitosan, crosslinking substances of the polysaccharides, and the like. Examples of the thickening agent include carboxyl methyl cellulose, polyvinyl alcohol, and the like.

For example, the cathode may be obtained by applying a paste-like cathode mix to the cathode current collector, drying the cathode mix, and compression-molding the resultant cathode current collector, or compression-molding a powder grain-like cathode mix on the cathode current. The thickness of the cathode is commonly 0.04 mm to 0.15 mm. A cathode having an arbitrary electrode density may be obtained by adjusting the pressure that is applied during molding. The pressure applied during molding is preferably approximately 1 $t/cm^2$ to 3 $t/cm^2$.

(Anode)

As the anode, a sheet-like electrode, which includes an anode mix containing an anode active material, a binding agent, and a conductive additive contained optionally as necessary, and an anode current collector bonded to the anode mix, may be used. In addition, as the anode, a pellet-type or sheet-like anode, which is formed by molding the anode mix into a circular plate, may be used.

As the anode active material, an anode active material that is known in the related art may be used, and for example, a carbon material such as artificial graphite and natural graphite, a metal or metalloid material such as Sn and Si may be used.

As the binding agent, the same binding agent as that used in the cathode may be used.

Furthermore, the conductive additive may be added as necessary, or may not be added. For example, a conductive carbon powder such as furnace black, ketjen black, and acetylene black, carbon nanotube, carbon nanofiber, vapor phase method carbon fiber, and the like may be used. As the conductive additive, the vapor phase method carbon fiber is particularly preferable. The fiber length of the vapor phase method carbon fiber is preferably 5 nm to 0.2 μm. The ratio of fiber length to fiber diameter is preferably 5 to 1000. The amount of the vapor phase method carbon fiber is preferably 0.1% by mass to 10% by mass on the basis of the dried mass of the anode mix.

Furthermore, examples of the anode current collector include foil of a conductive metal, a net of the conductive metal, a punched metal of the conductive metal, and the like. As the conductive metal, copper or a copper alloy is preferable.

For example, the anode may be obtained by applying a paste-like anode mix to the anode current collector, drying the anode mix, and compression-molding the resultant anode current collector, or compression-molding a powder grain-like anode mix on the anode current collector. The thickness of the anode is commonly 0.04 mm to 0.15 mm. An anode having an arbitrary electrode density may be obtained by adjusting a pressure that is applied during molding. The pressure applied during molding is preferably approximately 1 t/cm$^2$ to 3 t/cm$^2$.

(Nonaqueous Electrolyte)

Next, as the nonaqueous electrolyte, for example, a nonaqueous electrolyte obtained by dissolving a lithium salt in an aprotic solvent is an exemplary example.

As the aprotic solvent, a mixed solvent of at least one or more kinds selected from a group consisting of ethylene carbonate, diethyl carbonate, dimethyl carbonate, methyl ethyl carbonate, propylene carbonate, butylene carbonate, and γ-butyrolactone, and vinylene carbonate is preferable.

In addition, examples of the lithium salt include $LiClO_4$, $LiPF_6$, $LiAsF_6$, $LiBF_4$, $LiSO_3CF_3$, $CH_3SO_3Li$, $CF_3SO_2Li$, and the like.

In addition, as the nonaqueous electrolyte, a so-called solid electrolyte or gel electrolyte may be used.

Examples of the solid electrolyte or gel electrolyte include a polymer electrolyte such as sulfonated styrene-olefin copolymer, a polymer electrolyte using polyethylene oxide and $MgClO_4$, a polymer electrolyte having trimethylene oxide structure, and the like. As the nonaqueous solvent used in a polymer electrolyte, at least one kind selected from a group consisting of ethylene carbonate, diethyl carbonate, dimethyl carbonate, methyl ethyl carbonate, propylene carbonate, butylene carbonate, and γ-butyrolactone, and vinylene carbonate is preferable.

Furthermore, the lithium secondary battery according to a preferable aspect of the embodiment may be provided with other members and the like as necessary without being limited to the cathode, the anode, and the nonaqueous electrolyte. For example, the lithium secondary battery may be provided with a separator that isolates the cathode and the anode from each other. The separator is a necessary component in a case where the nonaqueous electrolyte is not a polymer electrolyte. Examples of the separator include nonwoven fabric, woven fabric, a micro-porous film, a combination thereof, and the like. More specifically, a porous polypropylene film, a porous polyethylene film, and the like may be appropriately used.

The lithium secondary battery according to a preferred aspect of the embodiment may be used in various fields. For example, electric and electronic apparatuses such as a personal computer, a tablet computer, a note-type computer, a cellular phone, a wireless radio, an electronic organizer, an electronic dictionary, a PDA (Personal Digital Assistant), an electronic meter, an electronic key, an electronic tag, an energy storage device, a power tool, a toy, a digital camera, a digital video, AV equipment, and a vacuum cleaner; transportation systems such as an electric vehicle, a hybrid vehicle, an electric bike, a hybrid bike, an electric bicycle, an electric-assisted bicycle, a railway engine, an aircraft, and a vessel; power generation systems such as a solar power generation system, a wind power generation system, a tidal power generation system, a geothermal power generation system, a thermal difference power generation system, and a vibration power generation system; and the like.

EXAMPLES

Example 1

(1) Hydrothermal Synthesis

In a glove box of a nitrogen atmosphere in which an oxygen concentration was controlled to 0.5% or less, 123 g of $LiOH.H_2O$ (Manufactured by Kanto Chemical Co., Inc. deer special grade) was dissolved in 700 mL of water, and the resultant mixture was stirred. Furthermore, 113 g of 85.0% phosphoric acid (85.0% aqueous solution manufactured by Kanto Chemical Co., Inc. special grade) was gradually added to the mixture while being stirred. This solution refers to A solution. Next, in the glove box, 1.82 g of ascorbic acid was dissolved in 700 mL of water, and 272 g of $FeSO_4.7H_2O$ (special grade manufactured by Kanto Chemical Co., Inc.) was dissolved in the resultant mixture. This solution refers to B solution. Continuously, in the glove box, the A and B liquids were mixed and stirred, and then the resultant mixture was put into the autoclave and was hermetically closed. Then, the temperature of the autoclave was raised from room temperature to 200° C. for 1 hour, and retention was carried out at 200° C. for 3 hours to synthesize $LiFePO_4$ powder whereby a cathode material was produced. Then, natural cooling was carried out.

(2) Washing

After the autoclave was cooled to room temperature, the synthesized $LiFePO_4$ was taken out, then was filtered and washed 3 minutes with a liquid (Li concentration 1 mol/L) which was obtained by dissolving 5.498 g $Li_2SO_4$ in 100 g deionized water.

(3) Drying

The washed powder was heated in a vacuum to 100° C., and then was dried for 5 hours.

(4) Carbon Coating

Next, a sucrose solution obtained by dissolving 25 g of sucrose in 100 g of water was prepared, and 50 g of the sucrose solution was added to 100 g of the dried $LiFePO_4$ powder, and the resultant mixture was stirred. The $LiFePO_4$ powder, in which sucrose solution was added, was heated in vacuum at 100° C. for 5 hours to dry the mixture. The temperature of the dried $LiFePO_4$ powder was raised from room temperature to 700° C. for 90 minutes in nitrogen, and was heated at that temperature for 5 hours, and then natural cooling was carried out, whereby carbon was coated on the surface of the $LiFePO_4$ particles. Then, the $LiFePO_4$ powder coated with carbon was pulverized using A10 pulverizer manufactured by IKA Corporation.

(5) Cathode Plate Fabrication

Next, 5 g of acetylene black manufactured by DENKI KAGAKU KOGYO KABUSHIKI KAISHA as a conductive additive, 5 g of PVDF (polyvinylidene fluoride) manufactured by KUREHA CORPORATION as a binding agent, and 300 g of NMP (N-methyl-2-pyrolidone) as a solvent were added to 90 g of the $LiFePO_4$ powder, and then the resultant mixture was agitated to be uniform. The mixture after agitation was applied onto Al foil at a thickness of 30 and then was dried at 90° C. The dried mixture was pressed in order for the cathode mix to have a density of 2.2 g/cm$^3$, and thereby obtaining a cathode.

(6) Anode Plate Fabrication

Next, 5 g of acetylene black manufactured by DENKI KAGAKU KOGYO KABUSHIKI KAISHA as a conductive additive, 5 g of PVDF manufactured by KUREHA CORPORATION as a binding agent, and 50 g of NMP as a solvent were added to 95 g of mesocarbon microbead graphite manufactured by OSAKA GAS Co., LTD as an anode active material, and the resultant mixture was agitated to be uniform. The mixture after agitation was applied onto Cu foil at a thickness of 35 μm, and then was dried at 90° C. The dried mixture was pressed in order for the anode mix to have a density of 1.5 g/cm$^3$, and thereby obtaining an anode.

(7) Production of Battery

A micro-porous film formed from polypropylene (cell guard 2400) as a separator, and the anode were overlapped on the cathode, and a liquid, which was obtained by dissolving 1.0 mole/L of LiPF$_6$ in a mixed liquid of EC (ethylene carbonate) and EMC (ethyl methyl carbonate) with a volume ratio of 2:3, was put in as an electrolytic solution, and was sealed in a coin-type battery.

(8) Charge-Discharge Test

At a temperature of 25° C., a cycle, in which constant current and constant voltage charging was carried out to 3.9 V with a current of 0.02 C, and then constant current discharging to 2.3 V with each of currents of 0.1 C, 0.2 C, 0.5 C, 1 C and 2 C was carried out, was repeated 2 times. The discharge capacities at the 2$^{nd}$ cycle were measured. The discharging capacities with currents of 0.1 C, 0.2 C, 0.5 C, 1 C and 2 C were 156.4 mAh/g, 155.6 mAh/g, 152.1 mAh/g, 147.3 mAh/g and 139.5 mAh/g, respectively. The evaluation results are shown in Table 2.

Example 2

In Example 2, a battery was produced for evaluation under the same conditions as Example 1 except for the washing step.

The result of charge-discharge test and a detailed description of the washing step are shown as follows.

(1) Washing

After the autoclave was cooled to room temperature, the synthesized LiFePO$_4$ was taken out, then was filtered and washed 3 minutes with a liquid (Li concentration 0.1 mol/L) which was obtained by dissolving 0.370 g Li$_2$CO$_3$ in 100 g deionized water.

(2) Charge-Discharge Test

In the same manner as Example 1, at 25° C., a cycle, in which constant current and constant voltage charging was carried out to 3.9 V with a current of 0.02 C, and then constant current discharging to 2.3 V with each of currents of 0.1 C, 0.2 C, 0.5 C, 1 C and 2 C was carried out, was repeated 2 times. The discharge capacities at the 2$^{nd}$ cycle were measured. The discharge capacities with currents of 0.1 C, 0.2 C, 0.5 C, 1 C and 2 C were 152.6 mAh/g, 150.8 mAh/g, 146.6 mAh/g, 142.4 mAh/g, and 134.9 mAh/g, respectively. The evaluation results are shown in Table 2.

Example 3

In Example 3, a battery was produced for evaluation under the same conditions as Example 1 except for the washing step.

The result of charge-discharge test and a detailed description of the washing step are shown as follows.

(1) Washing

After the autoclave was cooled to room temperature, the synthesized LiFePO$_4$ was taken out, then was filtered and washed 3 minutes with a liquid (Li concentration 0.01 mol/L) which was obtained by dissolving 0.0386 g Li$_3$PO$_4$ in 100 g deionized water.

(2) Charge-Discharge Test

In the same manner as Example 1, at 25° C., a cycle, in which constant current and constant voltage charging was carried out to 3.9 V with a current of 0.02 C, and then constant current discharging to 2.3 V with each of currents of 0.1 C, 0.2 C, 0.5 C, 1 C and 2 C was carried out, was repeated 2 times. The discharge capacities at the 2$^{nd}$ cycle were measured. The discharge capacities with currents of 0.1 C, 0.2 C, 0.5 C, 1 C and 2 C were 149.7 mAh/g, 147.3 mAh/g, 145.6 mAh/g, 139.5 mAh/g, and 132.2 mAh/g, respectively. The evaluation results are shown in Table 2.

Example 4

In Example 4, a battery was produced for evaluation under the same conditions as Example 1 except for the washing step.

The result of charge-discharge test and a detailed description of the washing step are shown as follows.

(1) Washing

After the autoclave was cooled to room temperature, the synthesized LiFePO$_4$ was taken out, then was filtered and washed 3 minutes with a liquid (Li concentration 0.001 mol/L) which was obtained by dissolving 0.00386 g Li$_3$PO$_4$ in 100 g deionized water.

(2) Charge-Discharge Test

In the same manner as Example 1, at 25° C., a cycle, in which constant current and constant voltage charging was carried out to 3.9 V with a current of 0.02 C, and then constant current discharging to 2.3 V with each of currents of 0.1 C, 0.2 C, 0.5 C, 1 C and 2 C was carried out, was repeated 2 times. The discharge capacities at the 2$^{nd}$ cycle were measured. The discharge capacities with currents of 0.1 C, 0.2 C, 0.5 C, 1 C and 2 C were 146.4 m mAh/g, 144.4 mAh/g, 140.8 mAh/g, and 133.9 mAh/g, 124.4 mAh/g, respectively. The evaluation results are shown in Table 2.

Comparative Example 1

In Comparative Example 1, a battery was produced for evaluation under the same conditions as Example 1 except for the washing step.

The result of charge-discharge test and a detailed description of the washing step are shown as follows.

(1) Washing

After the autoclave was cooled to room temperature, synthesized LiFePO$_4$ was taken out, then was filtered 3 minutes from deionized water and washed.

(2) Charge-Discharge Test

In the same manner as Example 1, at 25° C., a cycle, in which constant current and constant voltage charging was carried out to 3.9 V with a current of 0.02 C, and then constant current discharging to 2.3 V with each of currents of 0.02 C, 0.05 C, 0.1 C, 0.2 C, 0.5 C, and 1 C was carried out, was repeated 2 times. The discharge capacities at the $2^{nd}$ cycle were measured. The discharge capacities with currents of 0.02 C, 0.05 C, 0.1 C, 0.2 C, 0.5 C, and 1 C were 144.7 mAh/g, 140.6 mAh/g, 132.2 mAh/g, 122.3 mAh/g and 111.8 mAh/g, respectively. The evaluation results are shown in Table 2.

Comparative Example 2

In Comparative Example 2, a battery was produced for evaluation under the same conditions as Example 1 except for the carbon coating step.

The result of charge-discharge test and a detailed description of the carbon coating step are shown as follows.

(1) Carbon Coating

The step is carried out under the same conditions as Example 1 except that a temperature of the dried LiFePO$_4$ powder was raised from room temperature to 700° C. for 90 minutes in a mixed gas of 1.2% oxygen and 98.8% nitrogen, and was heated at that temperature for 5 hours, and then natural cooling was carried out, whereby carbon was coated on the surface of the LiFePO$_4$ particles.

(2) Charge-Discharge Test

In the same manner as Example 1, at 25° C., a cycle, in which constant current and constant voltage charging was carried out to 3.9 V with a current of 0.02 C, and then constant current discharging to 2.3 V with each of currents of 0.02 C, 0.05 C, 0.1 C, 0.2 C, 0.5 C, and 1 C was carried out, was repeated 2 times. The discharge capacities at the $2^{nd}$ cycle were measured. The discharge capacities with currents of 0.02 C, 0.05 C, 0.1 C, 0.2 C, 0.5 C, and 1 C were 45.2 mAh/g, 43.2 mAh/g, 39.3 mAh/g, 28.0 mAh/g and 18.2 mAh/g, respectively. The evaluation results are shown in Table 2.

Comparative Example 3

In Comparative Example 3, a battery was produced for evaluation under the same conditions as Example 1 except for the carbon coating step.

The result of charge-discharge test and a detailed description of the carbon coating step are shown as follows.

(1) Carbon Coating

The step is carried out under the same conditions as Example 1 except that a temperature of the dried LiFePO$_4$ powder was raised from room temperature to 350° C. for 90 minutes under nitrogen, and was heated at that temperature for 5 hours, and then the natural cooling was carried out, whereby carbon was coated on the surface of the LiFePO$_4$ particles.

(2) Charge-Discharge Test

In the same manner as Example 1, at 25° C., a cycle, in which constant current and constant voltage charging was carried out to 3.9 V with a current of 0.02 C, and then constant current discharging to 2.3 V with each of currents of 0.02 C, 0.05 C, 0.1 C, 0.2 C, 0.5 C, and 1 C was carried out, was repeated 2 times. The discharge capacities at the $2^{nd}$ cycle were measured. The discharge capacities with currents of 0.02 C, 0.05 C, 0.1 C, 0.2 C, 0.5 C, and 1 C were 114.8 mAh/g, 109.3 mAh/g, 98.7 mAh/g, 81.0 mAh/g, 57.0 mAh/g, respectively. The evaluation results are shown in Table 2.

Comparative Example 4

In Comparative Example 4, a battery was produced for evaluation under the same conditions as Example 1 except for the carbon coating step.

The result of charge-discharge test and a detailed description of the carbon coating step are shown as follows.

(1) Carbon Coating

The step is carried out under the same conditions as Example 1 except that the temperature of the dried LiFePO$_4$ powder was raised from room temperature to 950° C. for 90 minutes under nitrogen, and was heated at that temperature for 5 hours, and then natural cooling was carried out, whereby carbon was coated on the surface of the LiFePO$_4$ particles.

(2) Charge-Discharge Test

In the same manner as Example 1, at 25° C., a cycle, in which constant current and constant voltage charging was carried out to 3.9 V with a current of 0.02 C, and then constant current discharging to 2.3 V with each of currents of 0.02 C, 0.05 C, 0.1 C, 0.2 C, 0.5 C, and 1 C was carried out, was repeated 2 times. The discharge capacities at the $2^{nd}$ cycle were measured. The discharge capacities with currents of 0.02 C, 0.05 C, 0.1 C, 0.2 C, 0.5 C, and 1 C were 127.4 mAh/g, 124.5 mAh/g, 116.4 mAh/g, 105.4 mAh/g, and 88.7 mAh/g, respectively. The evaluation results are shown in Table 2.

Comparative Example 5

In Comparative Example 5, a battery was produced for evaluation under the same conditions as Example 1 except for the carbon coating step.

The result of charge-discharge test and a detailed description of the carbon coating step are shown as follows.

(1) Carbon Coating

The step is carried out under the same conditions as Example 1 except that a temperature of the dried LiFePO$_4$ powder was raised from room temperature to 700° C. for 90 minutes under nitrogen, and was heated at that temperature for 0.5 hours, and then natural cooling was carried out, whereby carbon was coated on the surface of the LiFePO$_4$ particles.

(2) Charge-Discharge Test

In the same manner as Example 1, at 25° C., a cycle, in which constant current and constant voltage charging was carried out to 3.9 V with a current of 0.02 C at a temperature of 25° C., and then constant current discharging to 2.3 V with each of currents of 0.02 C 0.05 C, 0.1 C, 0.2 C, 0.5 C, and 1 C was carried out, was repeated 2 times. The discharge capacities at the $2^{nd}$ cycle were measured. The discharge capacities with currents of 0.02 C, 0.05 C, 0.1 C, 0.2 C, 0.5 C, and 1 C were 135.5 mAh/g, 131.1 mAh/g, 123.2 mAh/g, 113.9 mAh/g, 96.2 mAh/g, respectively. The evaluation results are shown in Table 2.

TABLE 2

| Discharge rate | Discharge capacity at the $2^{nd}$ cycle (mAh/g) | | | | | | | | |
|---|---|---|---|---|---|---|---|---|---|
| | Examples | | | | Comparative Examples | | | | |
| | 1 | 2 | 3 | 4 | 1 | 2 | 3 | 4 | 5 |
| 0.1C | 156.4 | 152.6 | 149.7 | 146.4 | 144.7 | 45.2 | 114.8 | 127.4 | 135.5 |
| 0.2C | 155.6 | 150.8 | 147.3 | 144.4 | 140.6 | 43.2 | 109.3 | 124.5 | 131.1 |
| 0.5C | 152.1 | 146.6 | 145.6 | 140.8 | 132.2 | 39.3 | 98.7 | 116.4 | 123.2 |

TABLE 2-continued

| Dis-charge rate | Discharge capacity at the $2^{nd}$ cycle (mAh/g) | | | | | | | | |
|---|---|---|---|---|---|---|---|---|---|
| | Examples | | | | Comparative Examples | | | | |
| | 1 | 2 | 3 | 4 | 1 | 2 | 3 | 4 | 5 |
| 1C | 147.3 | 142.4 | 139.5 | 133.9 | 122.3 | 28.0 | 81.0 | 105.4 | 113.9 |
| 2C | 139.5 | 134.9 | 132.2 | 124.4 | 111.8 | 18.2 | 57.0 | 88.7 | 96.2 |

As described above, the discharge capacities of Examples 1 to 4 are higher than the comparative examples, and in particular, the larger difference in the high rate side (2 C) has been confirmed. The results were obtained because that dissolution of the lithium ions from the lithium metal phosphate was suppressed by a washing step with the washing liquid containing lithium ion during the washing step after synthesizing a lithium metal phosphate.

The invention claimed is:

1. A method of producing a cathode active material for a lithium secondary battery, wherein the method comprises:
synthesizing a lithium metal phosphate represented by a composition formula $LiMPO_4$, wherein the element M represents one or two or more of transition metals selected from Fe, Mn, Co and Ni, and then
washing the lithium metal phosphate with a washing liquid containing lithium ions,
wherein a solvent of the washing liquid consists of water.

2. The method of producing a cathode active material for a lithium secondary battery according to claim 1, wherein a solute of the washing liquid comprises at least one of $LiClO_4$, $Li_2CO_3$, $LiOH$, $LiPF_6$, $Li_3PO_4$, $LiH_2PO_4$, and $CH_3CO_2Li$.

3. The method of producing a cathode active material for a lithium secondary battery according to claim 1, wherein pH of the washing liquid containing the lithium ions is in the range of from 5 to 9.

4. The method of producing a cathode active material for a lithium secondary battery according to claim 1, wherein the washing time is one hour or less.

5. The method of producing a cathode active material for a lithium secondary battery according to claim 1, wherein the post-synthesis lithium metal phosphate comprises one or two kinds of elements selected from the group consisting of V and Nb.

6. The method of producing a cathode active material for a lithium secondary battery according to claim 1, wherein a particle diameter of the post-synthesis lithium metal phosphate is in the range of from 20 to 200 nm.

7. The method of producing a cathode active material for a lithium secondary battery according to claim 1, wherein a ratio of Li atoms number to M atoms number in a region up to depth of 2 nm from a surface of the post-synthesis lithium metal phosphate is 0.7 or more and less than 1.1.

8. The method of producing a cathode active material for a lithium secondary battery according to claim 1, the method further comprises a step of forming a layer containing carbon on at least a portion of a surface of the lithium metal phosphate after the washing step.

9. The method of producing a cathode active material for a lithium secondary battery according to claim 8, wherein the step of forming a layer containing carbon on at least a portion of the surface of the lithium metal phosphate after the washing step comprises:
mixing the lithium metal phosphate with a liquid in which a material containing carbon atoms is dissolved, after the washing,
removing a solvent of the liquid in which a material containing carbon atoms is dissolved after the mixing step, and
heating the mixture of the lithium metal phosphate and the material containing carbon atoms for 1 hour to 20 hours under an atmosphere containing oxygen with a concentration 1% or less at a temperature of 400° C. to 900° C., after removing the solvent of the liquid in which the material containing carbon atoms is dissolved.

10. The method of producing a cathode active material for a lithium secondary battery according to claim 1, wherein the transition metal (M) in the $LiMPO_4$ is either Mn or Fe.

11. The method of producing a cathode active material for a lithium secondary battery according to claim 1, wherein the transition metal (M) in the $LiMPO_4$ comprises both Mn and Fe.

12. The method of producing a cathode active material for a lithium secondary battery according to claim 1, wherein the synthesizing step is carried out by hydrothermal synthesis method.

13. The method of producing a cathode active material for a lithium secondary battery according to claim 12, wherein the hydrothermal synthesis is carried out by using a liquid containing water, a lithium (Li) source, one or two or more kinds of transition metal (M) source, and a phosphoric acid ($PO_4$) source as raw materials.

14. The method of producing a cathode active material for a lithium secondary battery according to claim 12, wherein the hydrothermal synthesis is carried out by using a liquid containing water, $Li_3PO_4$, and one or two or more kinds of transition metal (M) source as raw materials.

15. The method of producing a cathode active material for a lithium secondary battery according to claim 13, wherein the transition metal (M) source is $MnSO_4$ and/or $FeSO_4$.

16. The method of producing a cathode active material for a lithium secondary battery according to claim 13, wherein LiOH is used as the lithium (Li) source.

17. The method of producing a cathode active material for a lithium secondary battery according to claim 13, wherein $H_3PO_4$ is used as the phosphate ($PO_4$) source.

18. The method of producing a cathode active material for a lithium secondary battery according to claim 1, wherein a water content with respect to the washing liquid is 94.8 mass % or more.

* * * * *